(12) United States Patent
Zhang et al.

(10) Patent No.: US 11,520,112 B2
(45) Date of Patent: Dec. 6, 2022

(54) OPTOELECTRONIC DEVICE AND METHOD OF MANUFACTURE THEREOF

(71) Applicant: ROCKLEY PHOTONICS LIMITED, Altrincham (GB)

(72) Inventors: Yi Zhang, Pasadena, CA (US); Chia-Te Chou, Pasadena, CA (US); William Vis, Pasadena, CA (US); Amit Singh Nagra, Altadena, CA (US); Hooman Abediasl, Thousand Oaks, CA (US)

(73) Assignee: Rockley Photonics Limited, Altrincham (GB)

( * ) Notice: Subject to any disclaimer, the term of this patent is extended or adjusted under 35 U.S.C. 154(b) by 0 days.

(21) Appl. No.: 17/092,151

(22) Filed: Nov. 6, 2020

(65) Prior Publication Data

US 2021/0141172 A1 May 13, 2021

Related U.S. Application Data

(60) Provisional application No. 62/933,281, filed on Nov. 8, 2019.

(51) Int. Cl.
| | | |
|---|---|---|
| G02B 6/42 | (2006.01) | |
| G02B 6/12 | (2006.01) | |
| G02B 6/125 | (2006.01) | |
| G02B 6/132 | (2006.01) | |
| G02B 6/136 | (2006.01) | |

(52) U.S. Cl.
CPC .......... *G02B 6/4214* (2013.01); *G02B 6/125* (2013.01); *G02B 6/423* (2013.01); *G02B 6/4207* (2013.01); *G02B 6/4239* (2013.01); *G02B 6/4244* (2013.01); *G02B 6/132* (2013.01); *G02B 6/136* (2013.01); *G02B 6/4249* (2013.01); *G02B 2006/12104* (2013.01)

(58) Field of Classification Search
None
See application file for complete search history.

(56) References Cited

U.S. PATENT DOCUMENTS

| | | | | |
|---|---|---|---|---|
| 5,195,150 A | * | 3/1993 | Stegmueller | G02B 6/4204 |
| | | | | 385/33 |
| 6,921,956 B2 | * | 7/2005 | Yang | G02B 6/4214 |
| | | | | 257/432 |

(Continued)

FOREIGN PATENT DOCUMENTS

| | | |
|---|---|---|
| JP | 2008-262116 A | 10/2008 |
| WO | WO 2016/064425 A1 | 4/2016 |

OTHER PUBLICATIONS

International Search Report and Written Opinion of the International Searching Authority, dated Feb. 11, 2021, Corresponding to PCT/IB2020/000943, 12 pages.

*Primary Examiner* — Michelle R Connelly
(74) *Attorney, Agent, or Firm* — Lewis Roca Rothgerber Christie LLP (57) ABSTRACT

An optoelectronic device. The device comprising: a silicon-on-insulator, SOI, wafer, the SOI wafer including a cavity and an input waveguide, the input waveguide being optically coupled into the cavity; and a mirror, located within the cavity and bonded to a bed thereof, the mirror including a reflector configured to reflect light received from the input waveguide in the SOI wafer.

21 Claims, 7 Drawing Sheets

(56) References Cited

U.S. PATENT DOCUMENTS

| | | | | |
|---|---|---|---|---|
| 7,316,512 B2* | 1/2008 | Shih | ............... | G02B 6/4214 |
| | | | | 385/47 |
| 7,433,554 B2* | 10/2008 | Warashina | ............... | G02B 6/43 |
| | | | | 385/132 |
| 9,011,020 B2* | 4/2015 | Ty Tan | ............... | G02B 6/34 |
| | | | | 385/53 |
| 2003/0142896 A1* | 7/2003 | Kikuchi | ............... | G02B 6/42 |
| | | | | 385/14 |
| 2007/0280585 A1* | 12/2007 | Warashina | ............... | G02B 6/43 |
| | | | | 385/14 |
| 2011/0129181 A1* | 6/2011 | Bolle | ............... | G02B 6/4214 |
| | | | | 385/14 |
| 2013/0315528 A1* | 11/2013 | Levy | ............... | G02B 6/425 |
| | | | | 29/832 |
| 2016/0238801 A1 | 8/2016 | Lee et al. | | |
| 2016/0306110 A1 | 10/2016 | Lambert | | |
| 2017/0141533 A1* | 5/2017 | Caer | ............... | H01S 5/0267 |
| 2019/0137703 A1* | 5/2019 | Heroux | ............... | G02B 6/34 |

\* cited by examiner

OPTOELECTRONIC DEVICE AND METHOD OF MANUFACTURE THEREOF

CROSS-REFERENCE TO RELATED APPLICATION(S)

The present application claims priority to and the benefit of U.S. Provisional Application No. 62/933,281, filed Nov. 8, 2019, entitled "OPTICAL MIRROR AND METHOD OF MANUFACTURE THEREOF", the entire contents of which are incorporated herein by reference.

FIELD OF THE INVENTION

The present invention relates to an optoelectronic device and a method of manufacture thereof.

BACKGROUND

In the field of optoelectronic devices, it is preferable to prepare devices which can be compactly integrated into consumer electronics. However, typical optoelectronic devices emit light at lateral edges of the device and this is not conducive to compact integration.

It is desirable then to develop devices which emit light through upper or lower surfaces of the device, whilst also providing protection from the environment and being manufacturable at low cost and with low optical losses.

SUMMARY

Accordingly, in a first aspect, embodiments of the invention provide an optoelectronic device comprising: a silicon-on-insulator, SOI, wafer, the SOI wafer including a cavity and an input waveguide, the input waveguide being optically coupled into the cavity; and
  a mirror, located within the cavity and bonded to a bed therefore, the mirror including a reflector configured to reflect light received from the input waveguide in the SOI wafer.

Such a device enables low loss out-of-plane optical turning, and is suitable for high volume manufacturing whilst displaying a broadband performance. Moreover the device can demonstrate enhanced reliability across a broad temperature range.

The optoelectronic device may have any one or, to the extent that they are compatible, any combination of the following optional features.

The mirror may be a micro-mirror. By micro-mirror, it may be meant that the mirror has a thickness of less than 100 µm, and lateral dimensions of around 1 mm×2 mm, or 1 mm×1 mm.

The mirror may be formed from silicon, and the reflector may be formed from a metal and may face the input waveguide.

The device may further comprise an underfill, between the reflector and the bed of the cavity. The underfill may be made of epoxy, or gel, and can provide refractive index matching (and so lower optical loss), increased reliability, and environmental control.

The device may further comprise a layer of adhesive, located between the mirror and the bed of the cavity. The adhesive may be, for example, an epoxy such as Addision Clear Wave A8539-DM. The adhesive may be made from the same material as the underfill.

The device may further comprise an anti-reflective coating, provided along one or more sidewalls and a bed of the cavity. The anti-reflective coating may be patterned for wavelength- or frequency-selective removal of light.

The input waveguide may be within a device layer of the SOI wafer.

The input waveguide may be configured to guide light along a guiding direction, and a coupling interface between the input waveguide and the cavity may be at an acute angle relative to the guiding direction. By acute angle, it may be meant that the coupling interface can be described by a vector extending perpendicular to a plane defining the coupling interface, and an angle between the guiding direction and the vector is less than 90°. As viewed from above, this results in a coupling interface which extends obliquely across the guiding direction.

The cavity may extend beyond an insulator layer of the SOI wafer and into a substrate thereof.

The device may further comprise an upper cladding layer, above a device layer of the SOI wafer.

The mirror may have a trapezoidal cross-section, and one of a pair of non-parallel sides may face the input waveguide.

The mirror may be configured to reflect light received from the input waveguide towards the bed of the cavity. This can help avoid electronic components.

The mirror may be configured to reflect the light by an angle of around 45°.

The device may further comprise a ridge, upstanding from the bed of the cavity, and which surrounds a protruding portion of the mirror, the protruding portion of the mirror being bonded to the bed of the cavity. The ridge structure provides a passive alignment structure for the mirror, and increases the dimensional accuracy of the structure. They allow fine alignment by fixing rotation, tilt, yaw, and X- or Y-shifts with respect to the input waveguide(s). The ridge interfaces with a recess of the mirror, surrounding the protruding portion. Y-alignment can be achieved by the height of the ridge. These alignment structures substantially lower power losses through the optoelectronic device.

In a second aspect, embodiments of the invention provide a method of manufacturing an optoelectronic device, the method comprising:
  providing a silicon-on-insulator, SOI, wafer, the SOI wafer including a cavity etched therein and an input waveguide optically coupled to the cavity;
  providing a mirror; and
  bonding the mirror to the cavity of the SOI wafer, such that the mirror reflects light received from the input waveguide in the SOI wafer.

Such a method provides a device with low loss out-of-plane optical turning, and is suitable for high volume manufacturing whilst displaying a broadband performance.

The method may have any one, or any combination insofar as they are compatible, of the following optional features.

Bonding the mirror to the cavity of the SOI wafer may include a flip-chip bonding process.

Bonding the mirror to the cavity of the SOI wafer may include using a micro-transfer printing process. The micro-transfer printing process may include providing an adhesive into the cavity before transferring the mirror into the cavity. The adhesive may be for example a dielectric, e.g. BCB or benzocyclobutene.

Bonding the mirror to the cavity of the SOI wafer may include depositing an adhesive between the mirror and the cavity.

The optoelectronic device resulting from the method of the second aspect may include any of the features of the optoelectronic device of the first aspect.

In a third aspect, embodiments of the invention provide an optoelectronic device produced using the method of the second aspect.

Further aspects of the present invention provide: a computer program comprising code which, when run on a computer, causes the computer to perform the method of the second aspect; a computer readable medium storing a computer program comprising code which, when run on a computer, causes the computer to perform the method of the second aspect; and a computer system programmed to perform the method of the second aspect.

BRIEF DESCRIPTION OF THE DRAWINGS

Embodiments of the invention will now be described by way of example with reference to the accompanying drawings in which.

DETAILED DESCRIPTION AND FURTHER OPTIONAL FEATURES

Aspects and embodiments of the present invention will now be discussed with reference to the accompanying figures. Further aspects and embodiments will be apparent to those skilled in the art.

Figure 1:
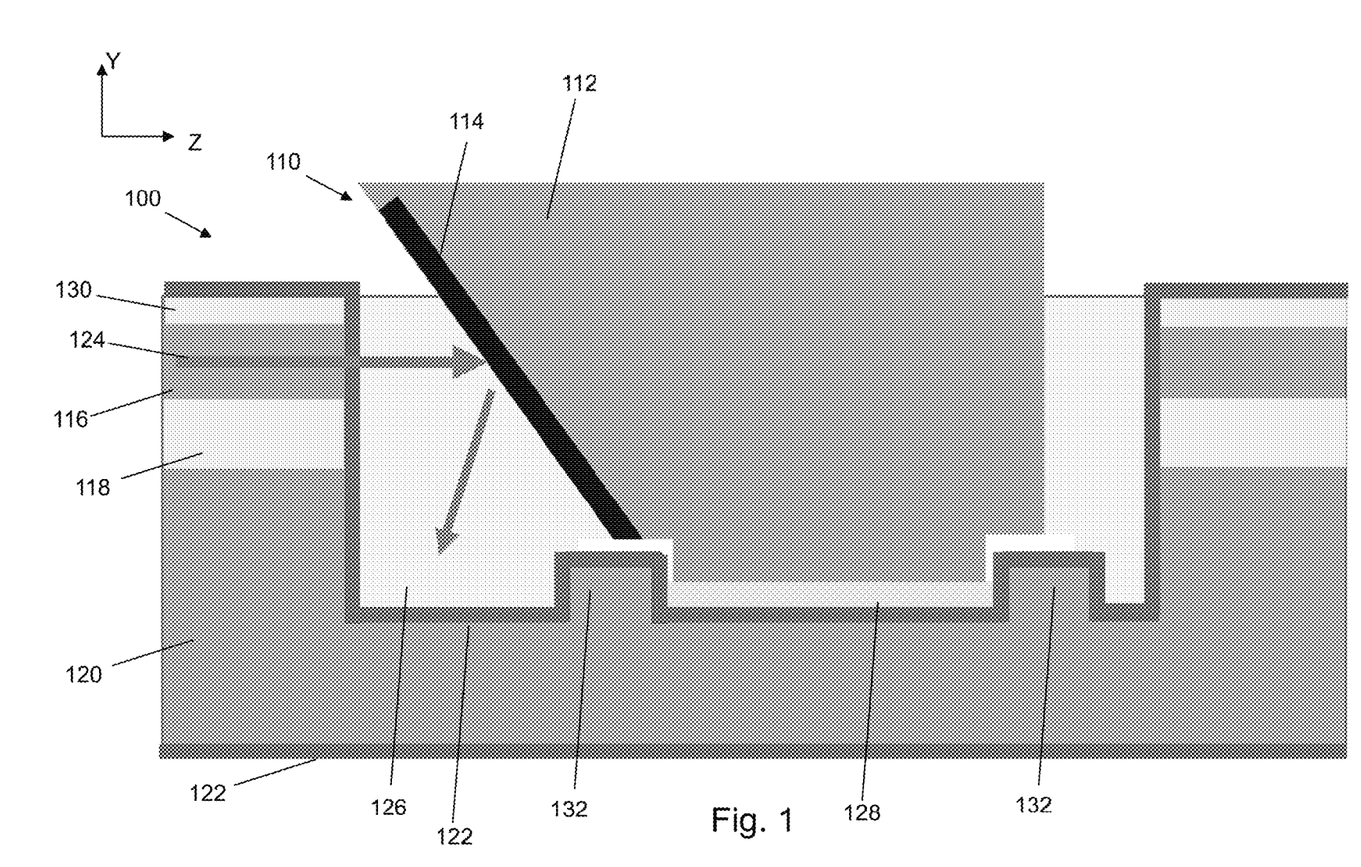
FIG. 1 shows a first cross-sectional view of an optoelectronic device.

FIG. 1 shows a first cross-sectional view of an optoelectronic device 100. The device comprises a silicon-on-insulator (SOI) wafer formed of: silicon substrate 120, buried oxide layer 118, and device layer 116. A cavity is present in the wafer, and extends through the device layer 116, buried oxide layer 118, and part way through substrate 120. A mirror, and specifically a micro-mirror, 110 is located within the cavity and bonded to a bed therefore via adhesive 128. The micro-mirror includes silicon block 112 to which is mounted a reflector 114. The reflector is made, in this example, from a metal such as aluminium or copper. The reflector is positioned such that light 124, when emitted from one or more waveguides in the device layer 116, is reflected down towards the substrate. The substrate 120 has a thickness such that it is substantially transparent to the light 124 used in the optoelectronic device. The cavity not occupied by the mirror 110 is filled with underfill 126. The underfill may be formed from epoxy or gel. Advantageously the underfill can function as an index matching fill between the cavity, the silicon device layer, and/or the silicon substrate. The underfill also provides environmental control, and improves reliability. The mirror can be fabricated through anisotropic etching. As can be seen in FIG. 1, the mirror 110 has a trapezoidal cross-section and one of a pair of non-parallel sides includes the reflector 114.

The optoelectronic device includes an antireflective coating 122, which coats both the cavity and an opposing, lower in FIG. 1, surface of the substrate. This opposing surface of the substrate is the one through which light 124 will exit once has been reflected by mirror 110.

Figure 2:
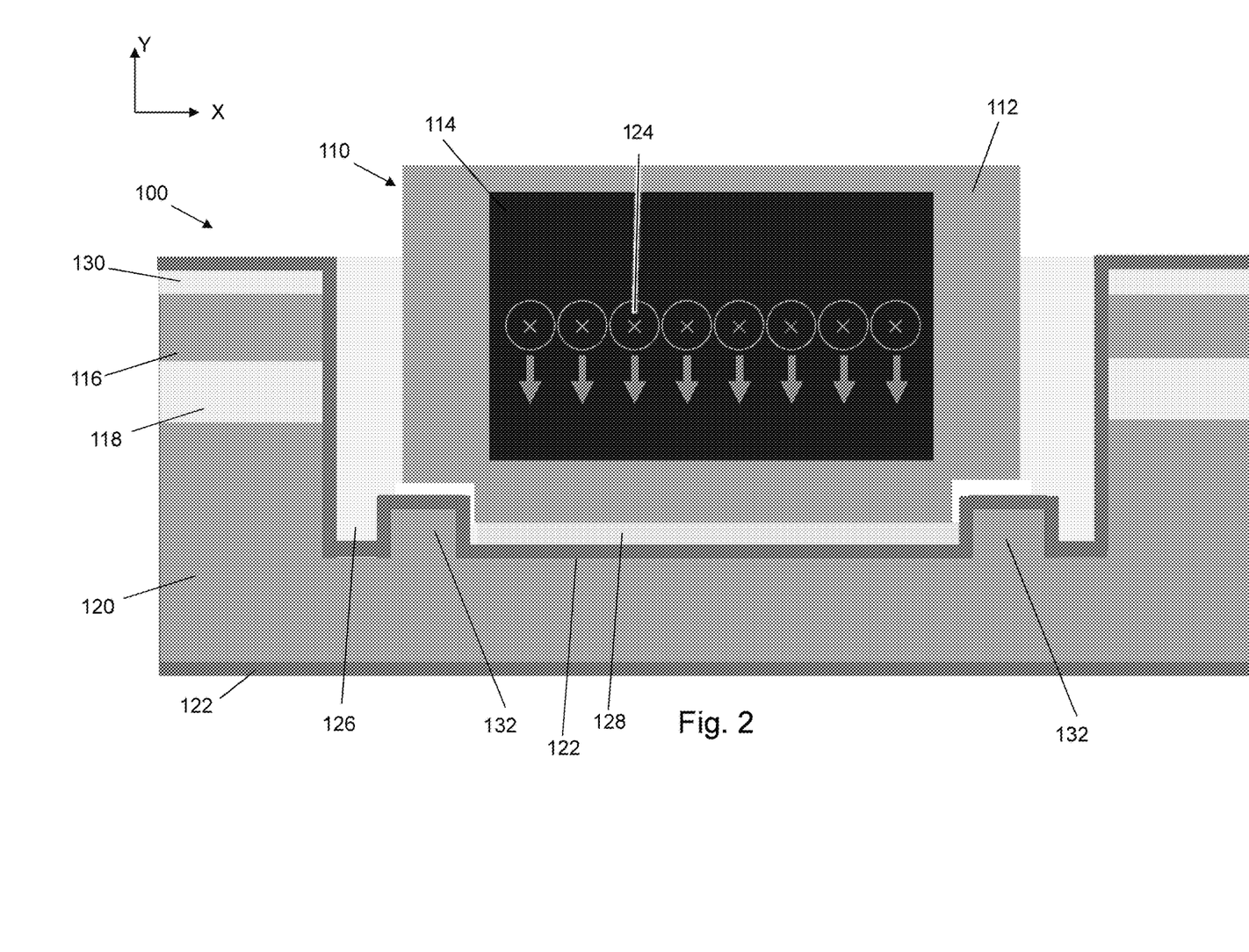
FIG. 2 shows a second cross-sectional view of the optoelectronic device of FIG. 1.

The cavity also includes one or more ridges 124. These protrude from the bed of the cavity, and serve to physically locate the mirror 110 in the cavity through passive alignment. FIG. 2 shows a second cross-sectional view of the optoelectronic device of FIG. 1 at 90° to the cross-section shown in FIG. 1. As can be seen the ridges in this example extend around all four sides of the generally rectangular mirror 110.

Figure 3:
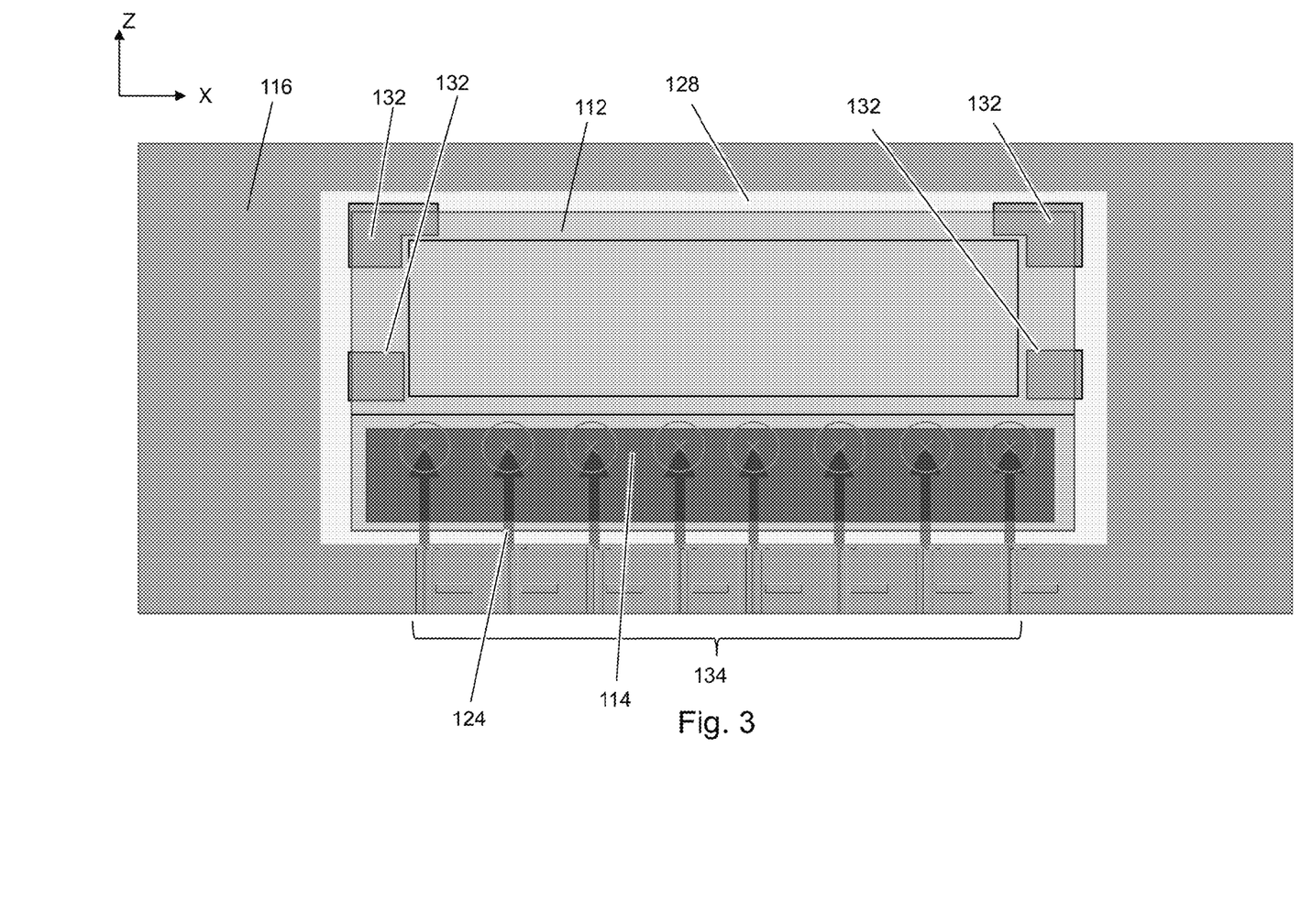
FIG. 3 shows a partial top-down view of the optoelectronic device of FIG. 1 and FIG. 2.
Figure 4:
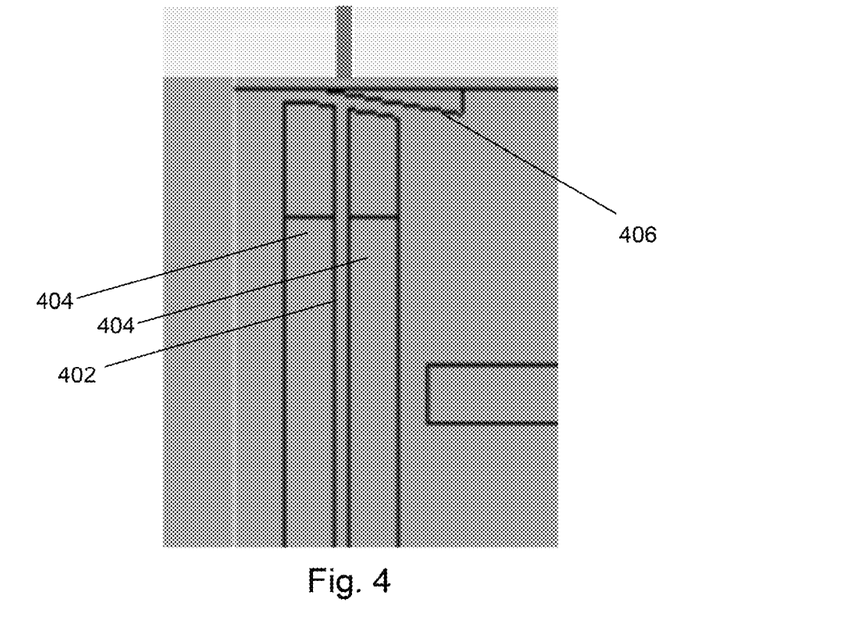
FIG. 4 is a magnified extract of FIG. 3.
Figure 5:
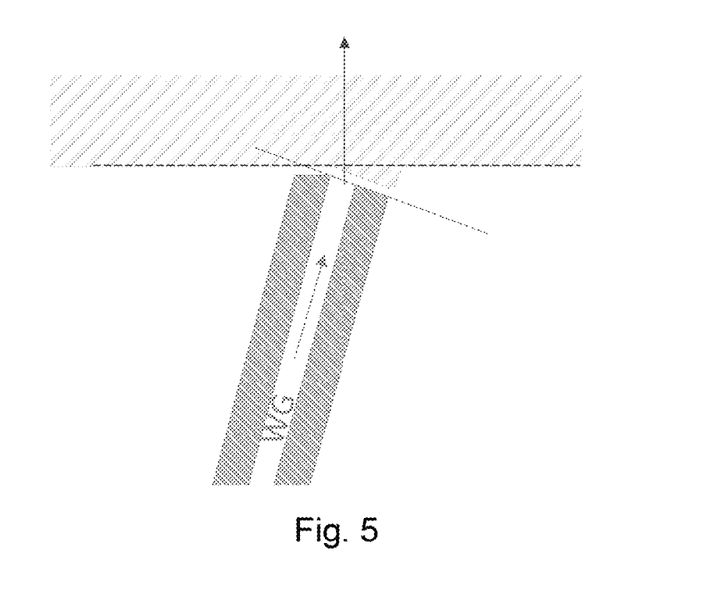
FIG. 5 is a schematic view of an angled waveguide.

FIG. 3 shows a partial top-down view of the optoelectronic device of FIG. 1 and FIG. 2. The view in FIG. 3 omits various layers for clarity, and shows various features (e.g. ridges 132) which would normally be hidden by other structures. As can be seen, in the example of FIG. 1 the device contains four ridges 132 arranged at the four corners of silicon block 112. The two ridges distalmost from reflector 114 extend around two sides of the silicon block, and so locate it in both X and Y. Whereas the ridges located nearest reflector 114 extend only along the one respective side of the silicon block and so locate it only in X. Also shown in FIG. 3 is a waveguide array 134, which is contained within the device layer. The waveguide array includes a plurality of silicon waveguides, formed by etching trenches either side of a ridge or rib. The trenches may be etched, for example, through reactive ion etching. The waveguides are they coated in a cladding to provide optical confinement. FIG. 4 is a magnified extract of FIG. 3. As can be seen, trenches 404 are separated by waveguide ridge 402, thereby providing a ridge or rib waveguide. The waveguide includes an angled facet or interface 406 at the end adjacent to the cavity. FIG. 5 is a schematic view of the angled waveguide facet or interface. The angled facet further reduces optical losses by minimising back reflection at the interface into the cavity.

Figure 6:
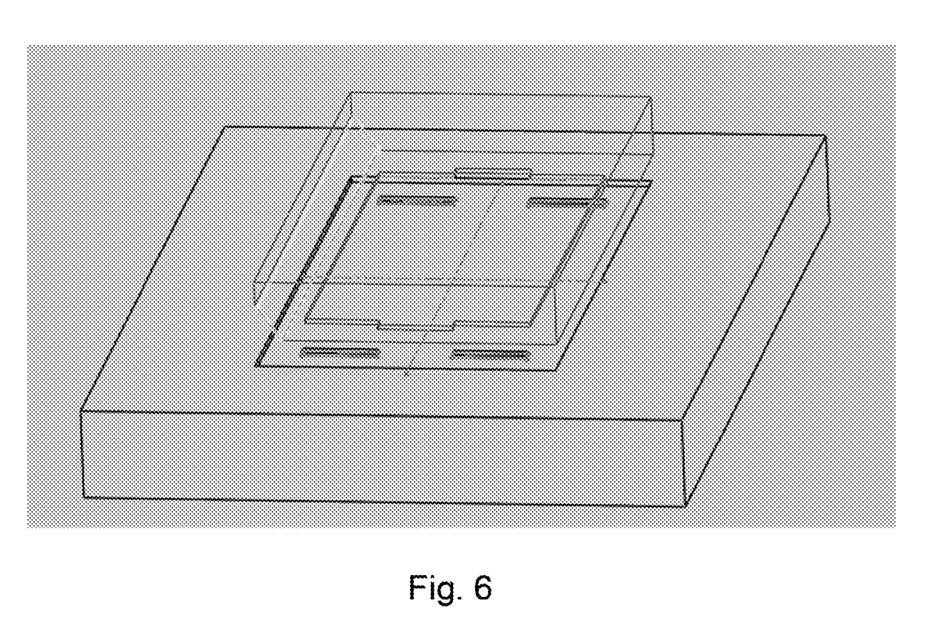
FIG. 6 is a 3D perspective view of the optoelectronic device of FIG. 1.
Figure 7:
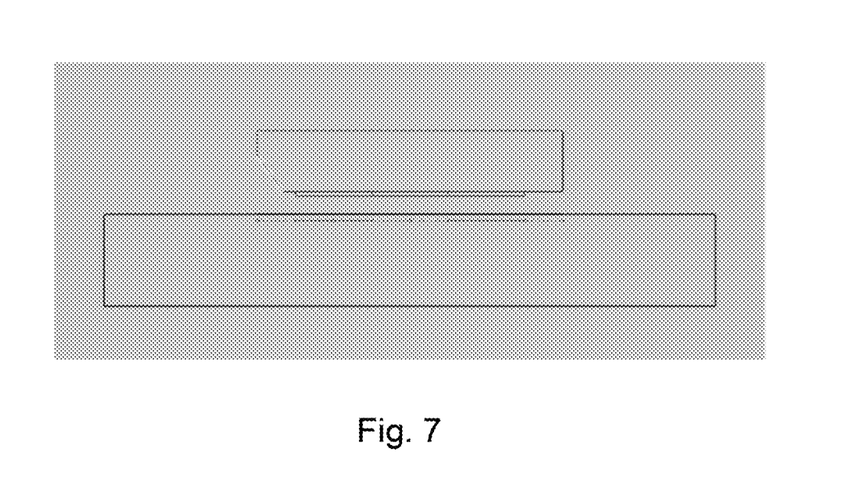
FIG. 7 is a partial 3D side-on view of the optoelectronic device of FIG. 1.

FIG. 6 is a 3D perspective view of the optoelectronic device of FIG. 1 and FIG. 7 is a partial 3D side-on view of the optoelectronic device of FIG. 1 before the mirror is bonded to the SOI wafer. During fabrication, the mirror is flip-chip bonded or micro-transfer printed from a device wafer on which it was fabricated into the cavity of the SOI wafer (which may be referred to as a platform wafer). The ridges 134 discussed previously ensure self-alignment during assembly.

Figure 8:
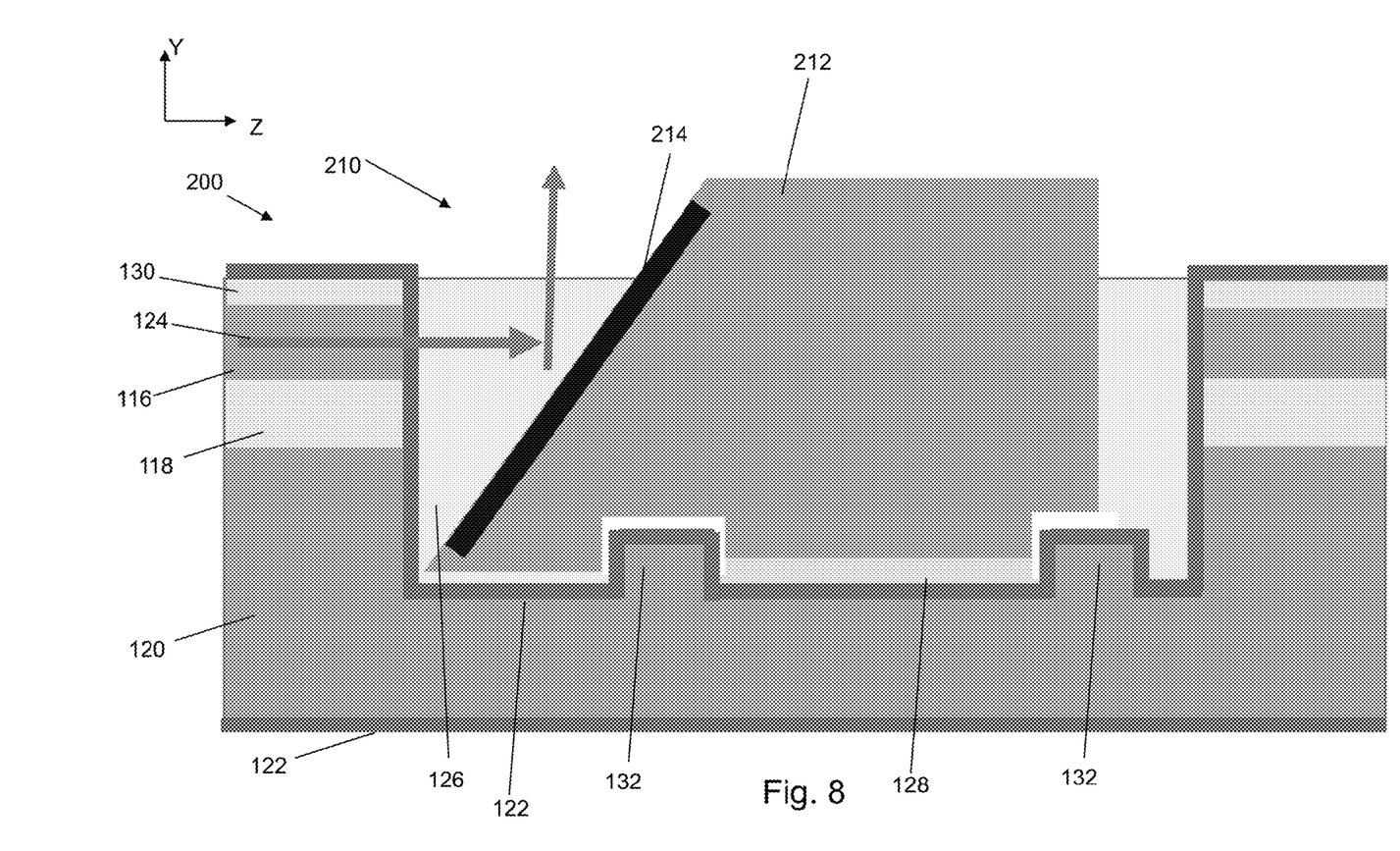
FIG. 8 is a cross-sectional view of a variant optoelectronic device.

FIG. 8 is a variant optoelectronic device 200. Where it shares features with the optoelectronic device(s) shown previously, like features are indicated by like reference numerals. In contrast to the variant optoelectronic device shown in FIG. 1, the reflector 214 in mirror 210 of FIG. 8 is positioned such that light 124, when emitted from one or more waveguides in the device layer 116, is reflected up away from the substrate 120. The silicon block 212 therefore extends partially around ridges 132.

Figure 9:
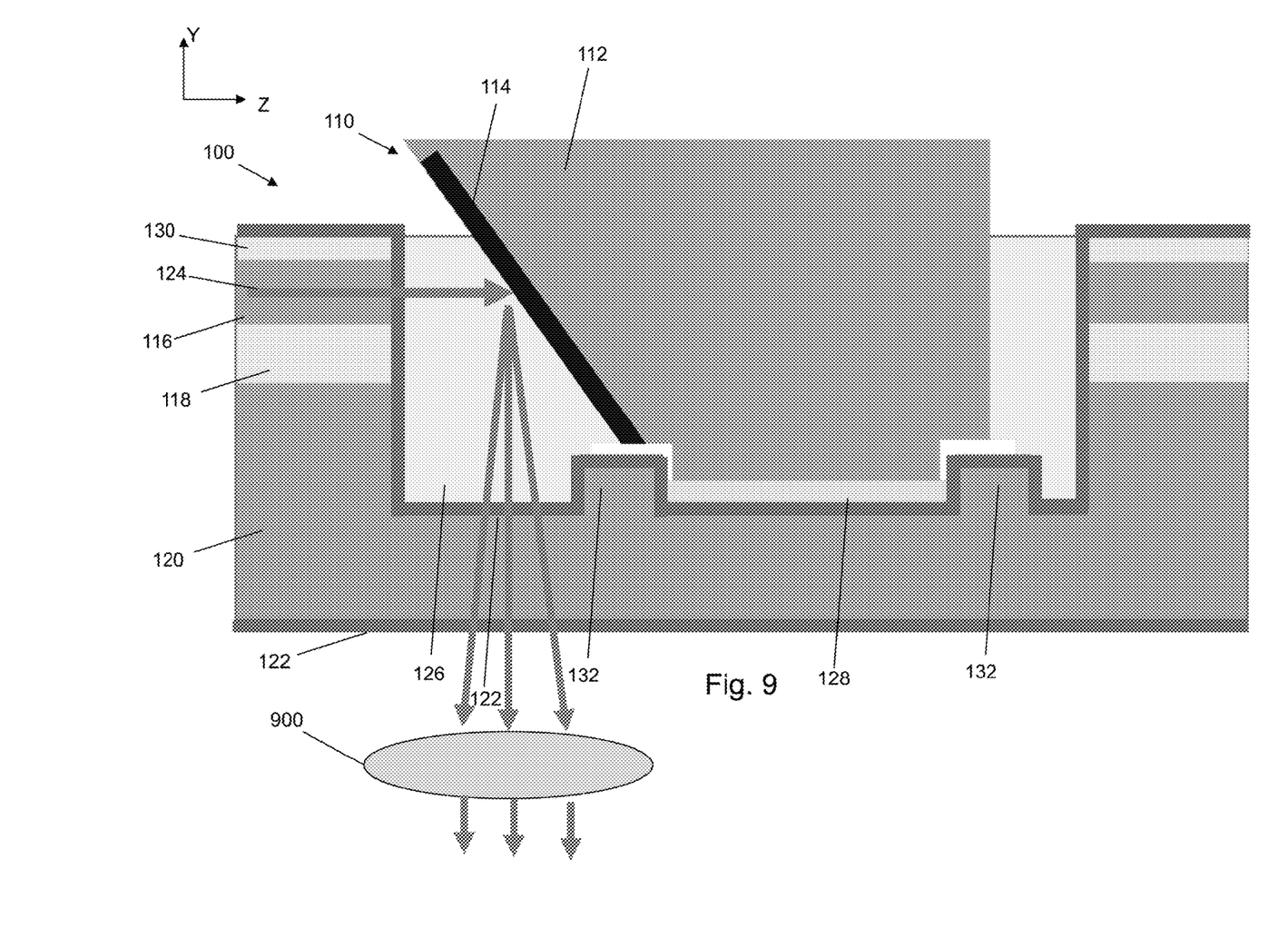
FIG. 9 is a cross-sectional view of an extension of the optical system comprising the optoelectronic device of FIG. 1.

FIG. 9 shows an extension of the optical system containing the optoelectronic device 100 of FIG. 1. Here, collimating optics 900 (e.g. formed of microlenses) are positioned downstream of the reflector 114. It should be noted that the collimating optics could also be provided for the optoelectronic device 200 shown in FIG. 8, whereupon they would be located above the substrate. The collimating optics may be provided, for example, as a lens adhered to a lower surface of the substrate.

Whilst the SOI wafers of the embodiments described above all include ridges 132, in other embodiments (not shown) these ridges are not present. Here, the silicon block 112 or 212 would typically have a flat lower surface for bonding to the bed of the cavity.

The features disclosed in the description, or in the following claims, or in the accompanying drawings, expressed in their specific forms or in terms of a means for performing the disclosed function, or a method or process for obtaining the disclosed results, as appropriate, may, separately, or in any combination of such features, be utilised for realising the invention in diverse forms thereof.

While the invention has been described in conjunction with the exemplary embodiments described above, many equivalent modifications and variations will be apparent to those skilled in the art when given this disclosure. Accordingly, the exemplary embodiments of the invention set forth above are considered to be illustrative and not limiting. Various changes to the described embodiments may be made without departing from the spirit and scope of the invention.

For the avoidance of any doubt, any theoretical explanations provided herein are provided for the purposes of improving the understanding of a reader. The inventors do not wish to be bound by any of these theoretical explanations.

Any section headings used herein are for organizational purposes only and are not to be construed as limiting the subject matter described.

Throughout this specification, including the claims which follow, unless the context requires otherwise, the word "comprise" and "include", and variations such as "comprises", "comprising", and "including" will be understood to imply the inclusion of a stated integer or step or group of integers or steps but not the exclusion of any other integer or step or group of integers or steps.

It must be noted that, as used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by the use of the antecedent "about," it will be understood that the particular value forms another embodiment. The term "about" in relation to a numerical value is optional and means for example +1-10%.

LIST OF FEATURES

100 Optoelectronic device
110 Mirror
112 Silicon block
114 Reflector
116 SOI layer
118 Buried oxide
120 Substrate
122 Anti-reflective coating
124 Light transmission path
126 Underfill
128 Adhesive
130 Cladding
132 Ridge
134 Waveguide array
210 Mirror
212 Silicon block
214 Reflector
404 Trench
402 Waveguide ridge
406 Interface

The invention claimed is:

1. An optoelectronic device, comprising:
  a silicon-on-insulator (SOI) wafer, the SOI wafer including a cavity and an input waveguide, the input waveguide being optically coupled into the cavity;
  a mirror, located within the cavity and bonded to a bed thereof, the mirror including a reflector configured to reflect light received from the input waveguide; and
  a ridge protruding from the bed of the cavity and overlapping the mirror in a plan view.

2. The optoelectronic device of claim 1, wherein the mirror is a micro-mirror.

3. The optoelectronic device of claim 1, wherein the mirror is formed from silicon and the reflector is formed from a metal and faces the input waveguide.

4. The optoelectronic device of claim 1, wherein the optoelectronic device further comprises an underfill, between the reflector and the bed of the cavity.

5. The optoelectronic device of claim 1, further comprising a layer of adhesive, located between the mirror and the bed of the cavity.

6. The optoelectronic device of claim 1, further comprising an anti-reflective coating, provided along one or more sidewalls and the bed of the cavity.

7. The optoelectronic device of claim 1, wherein the input waveguide is within a device layer of the SOI wafer.

8. The optoelectronic device of claim 1, wherein the input waveguide is configured to guide light along a guiding direction, and a coupling interface between the input waveguide and the cavity is at an acute angle relative to the guiding direction.

9. The optoelectronic device of claim 1, wherein the cavity extends beyond an insulator layer of the SOI wafer and into a substrate layer thereof.

10. The optoelectronic device of claim 1, further comprising an upper cladding layer, above a device layer of the SOI wafer.

11. The optoelectronic device of claim 1, wherein the mirror has a trapezoidal cross-section, and wherein one of a pair of non-parallel sides faces the input waveguide.

12. The optoelectronic device of claim 1, wherein the mirror is configured to reflect the light by an angle of around 45°.

13. The optoelectronic device of claim 1, comprising a plurality of ridges including the ridge, wherein the mirror comprises a protruding portion and is bonded to the bed of the cavity at the protruding portion, and the plurality of ridges are arranged around, and adjacent to, the protruding portion of the mirror in the plan view.

14. The optoelectronic device of claim 1,
  wherein the reflector is configured to reflect the light received from the input waveguide into the bed of the cavity.

15. The optoelectronic device of claim 14, wherein the optoelectronic device is configured so that the light reflected by the mirror into the bed of the cavity is transmitted out of the SOI wafer through a bottom surface of the SOI wafer.

16. The optoelectronic device of claim 14, further comprising an anti-reflective coating covering a portion of the bed of the cavity where the mirror is configured to reflect the light into the bed of the cavity.

17. A method of manufacturing an optoelectronic device, the method comprising:
  providing a silicon-on-insulator (SOI) wafer, the SOI wafer including a cavity etched therein, an input waveguide optically coupled to the cavity, and a ridge protruding from a bed of the cavity;

providing a mirror; and bonding the mirror to the cavity of the SOI wafer, such that the mirror:
  overlaps the ridge in a plan view, and
  reflects light received from the input waveguide.

18. The method of claim 17, wherein bonding the mirror to the cavity of the SOI wafer includes using a flip-chip bonding process.

19. The method of claim 17, wherein bonding the mirror to the cavity of the SOI wafer includes using a micro-transfer printing process.

20. The method of claim 17, wherein bonding the mirror to the cavity of the SOI wafer includes depositing an adhesive between the mirror and the cavity.

21. An optoelectronic device, produced using the method of claim 17.

* * * * *